Feb. 26, 1952    H. J. SIEKMANN ET AL    2,587,542
DUPLICATOR ATTACHMENT FOR LATHES
Filed Sept. 10, 1947    4 Sheets-Sheet 1

INVENTORS.
HAROLD J. SIEKMANN
GEORGE J. KASSELMANN
BY
ATTORNEYS.

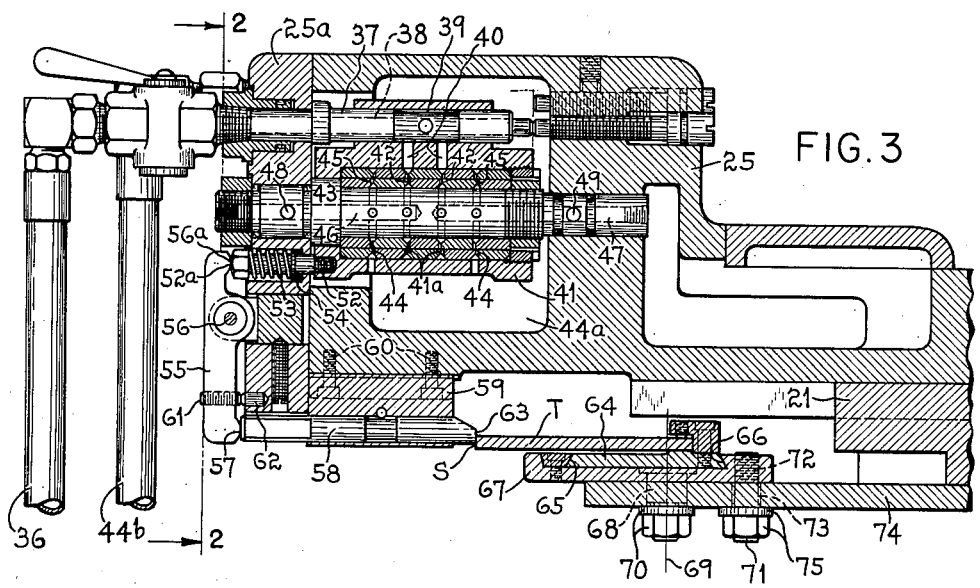
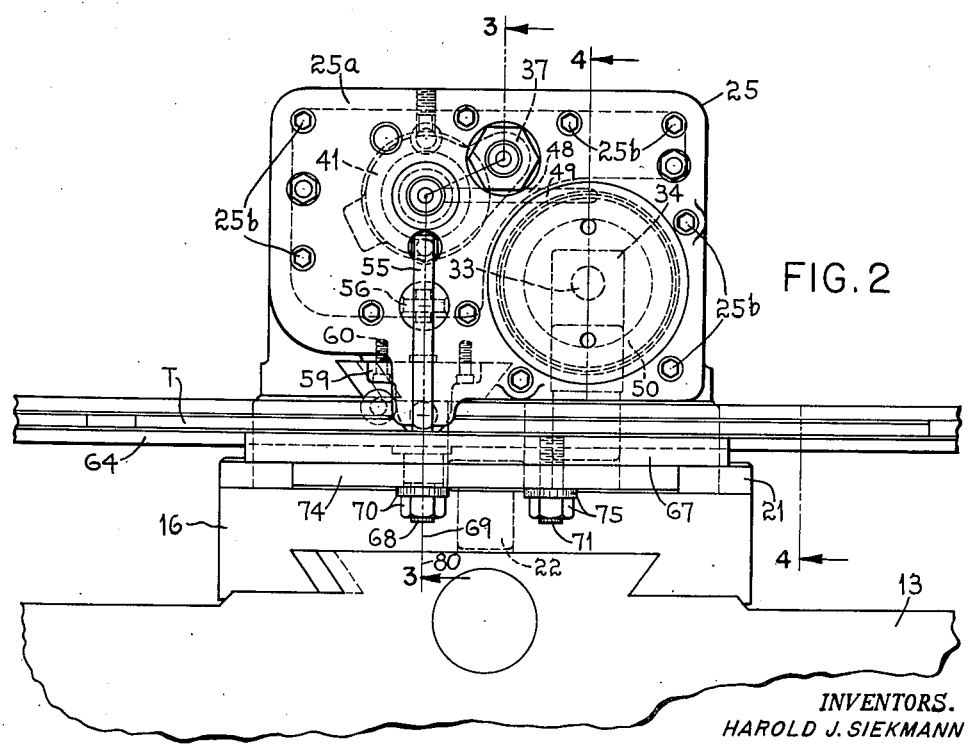

INVENTORS.
HAROLD J. SIEKMANN
GEORGE J. KASSELMANN
BY
Toulmin & Toulmin
ATTORNEYS.

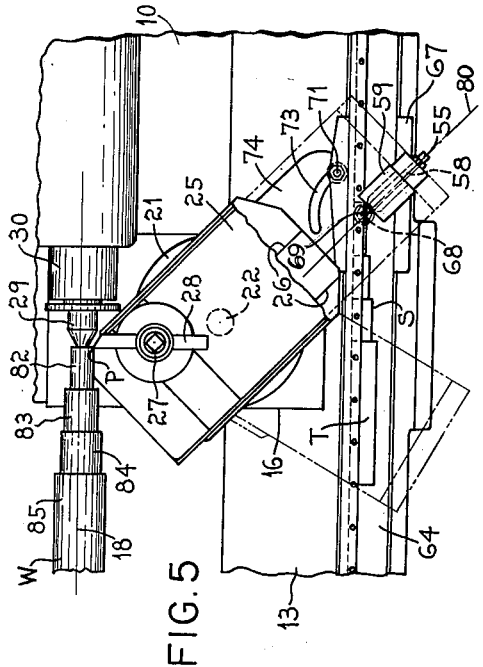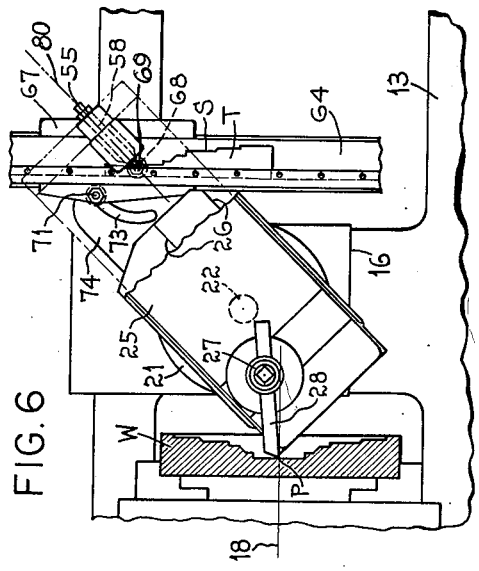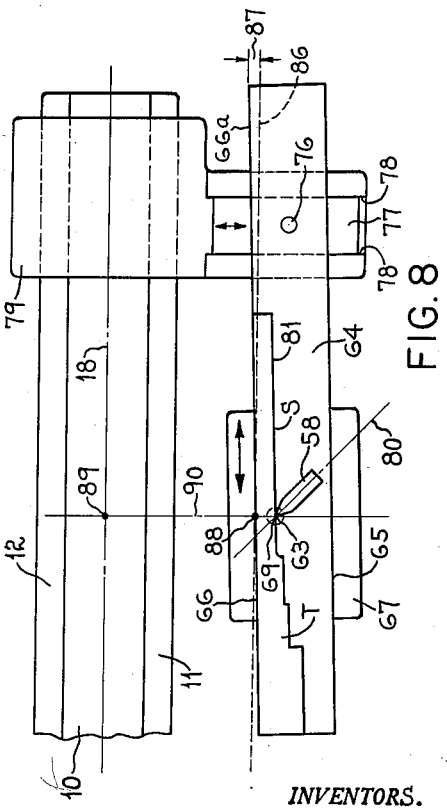

Patented Feb. 26, 1952

2,587,542

UNITED STATES PATENT OFFICE 2,587,542

DUPLICATOR ATTACHMENT FOR LATHES

Harold J. Siekmann and George J. Kasselmann, Cincinnati, Ohio, assignors to The R. K. Le Blond Machine Tool Company, Cincinnati, Ohio, a corporation of Delaware Application September 10, 1947, Serial No. 773,188

3 Claims. (Cl. 82—14)

1

This invention pertains to improvements in tracer controlled duplicating mechanism for machine tools and is particularly directed to improvements in such duplicator attachments for lathes.

One of the objects of this invention is to provide an improved and simplified attachment which may be quickly and easily applied to a lathe or other machine tool without precise and delicate adjustments being required.

Another object of this invention is to provide an improved arrangement for the template and tracer finger or stylus of the duplicator attachment.

It is also an object of this invention to provide an improved mounting for the template bar which is connected to the duplicator attachment of the lathe in a particular relationship to the tip of the tracer finger of the attachment.

It is further an object of this invention to provide an improved template and tracer finger arrangement in which the template bar is carried in part by the attachment and cross slide of the lathe for movement transverse of the lathe work spindle axis and to provide means for holding the template bar against longitudinal movement of the lathe bed while at all times permitting the transverse adjustment of the attachment and bar as a whole.

Still another object of this invention is to provide a pivotally mounted guide member for the template bar on the tracer controlled attachment arranged in such a way that the tip of the stylus or finger of the tracer moves in a plane passing through the axis of the pivotal mounting of said guide member.

It is also an object of this invention to provide in a tracer controlled duplicating apparatus having a member actuable in feeding movement and a member adapted to be positioned for tracer controlled movements in any angularly related direction to the direction of feeding movement, a guide member for a template pivotally mounted on the feeding member in such a way that the direction of movement of the control finger of the tracer of the apparatus takes place in a plane passing through the axis of the pivotal mounting of said guide member for any direction of relative angularly related movement of the feeding and tracer controlled members.

Further features and advantages of this invention will appear from a detailed description of the drawings in which:

Figure 1 is a fragmentary enlarged plan view showing the attachment applied to the form turning of a work piece in a lathe.

2

Figure 2 is a front elevational view of the duplicator attachment indicated by the line 2—2 of Figure 1.

Figure 3 is an enlarged fragmentary section on the line 3—3 of Figure 2.

Figure 5 shows the application and setting of the attachment when it is being utilized to perform turning operations on the work piece in the lathe.

Figure 6 shows the attachment adjusted for effecting facing operations on a work piece chucked in the lathe.

Figure 7 shows the attachment adjusted for performing form turning work at intermediate positions between the operations of Figure 5 and Figure 6.

Figure 8 is a diagrammatic view showing the essential critical relationships of parts which effect applicants' desired result of simplicity and ease of adjustment in setting the attachment to the lathe.

Figure 1:
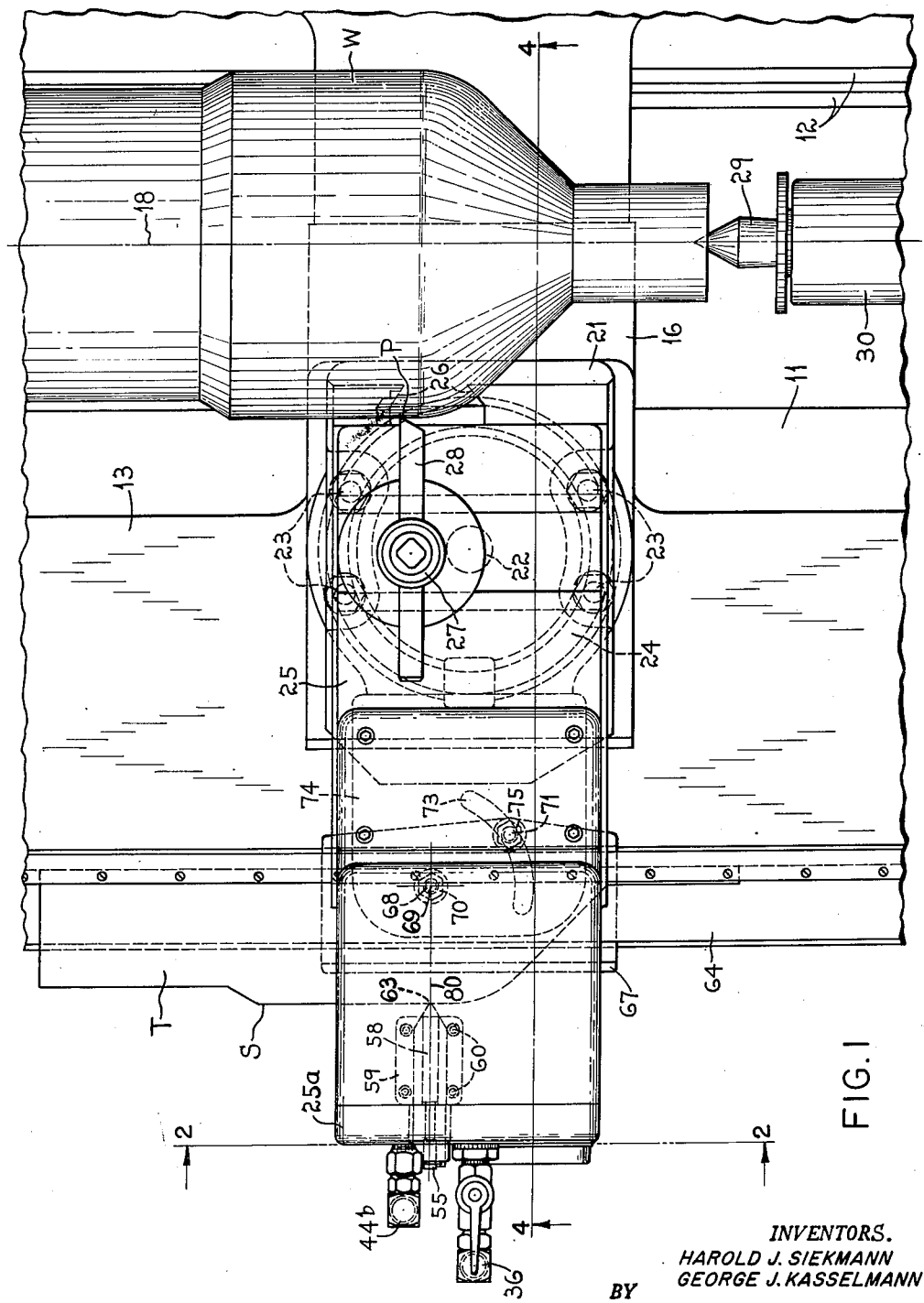

For exemplary purposes, this invention is shown applied to a hydraulic duplicator attachment for lathes, but it is understood that these improvements may be utilized in conjunction with any other type of template or tracer control mechanism, either of hydraulic, pneumatic or electric wherein there is to be effected relative movement of tracer finger and template to effect a tracer controlled operation of an actuable element or slide of a machine tool. In this example, noting particularly Figures 1, 4 and 5, there is shown a typical lathe having a bed 10 provided with ways 11 and 12 upon which is mounted for sliding longitudinal feeding movement the lathe carriage 13 actuated through the usual apron 14 and feed screw 15 in a well-known manner. On the carriage 13 is mounted the cross slide 16 on suitable guideways 17 which may be adjusted in transverse position relative to the work spindle axis 18 of the lathe by manipulating the usual adjusting dial 19 carried on the cross feed screw 20 of the lathe. The bottom swivel slide 21 of the duplicator attachment is pivotally mounted about the pin 22 for swinging movements on the cross slide 16 and may be clamped in adjusted positions by means of the usual T-slot bolts 23 operating in the annular T-slot groove 24 in the well-known manner of a compound rest arrangement for lathe. On the swivel slide 21 is mounted the tool slide 25 for movement on suitable guideways 26, the tool slide carrying the usual tool post 27 and cutting tool 28 adapted to engage the work piece W held on the work spindle axis 18 of the lathe by usual means such as the center 29 in the tailstock 30 and on a similar center (not shown) in the headstock of the lathe.

Figure 4:
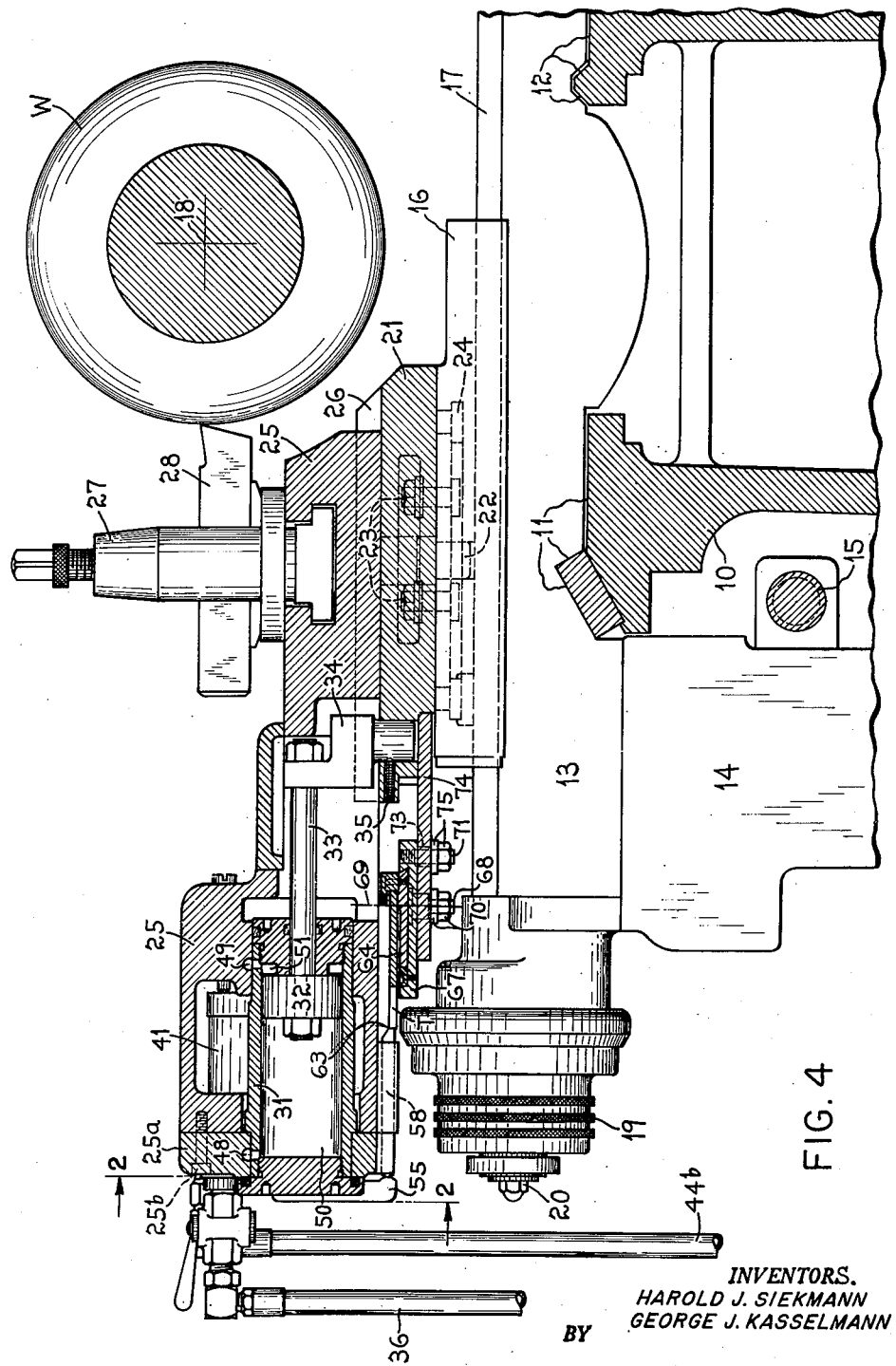
Figure 4 is a fragmentary enlarged transverse section through the lathe and attachment on the line 4—4 of Figures 1 and 2.

The total slide 25 is reciprocated by means of a hydraulic cylinder 31, Figure 4, fixed to the tool slide 25 and having a piston 32 and a piston rod 33 fixed to an abutment block 34 fixed in the swivel slide 21 by a suitable set screw 35. Fluid pressure for operating the cylinder 31 is derived from a suitable pressure source such as the pressure supply line 36, Figure 3, which is connected to the pressure supply spindle 37 having the passageway 38, Figure 3, which in turn supplies pressure to the annular groove 39 to the supply passageways 40 connected to the pressure supply ports 41a of the reciprocable tracer controlled valve sleeve 41. The ports 41a in turn are matched in a well-known manner with suitable ports 42 in fixed valve stem member 43 carried by the tool slide member 25 while suitable exhaust control ports 44 may be relatively adjusted to the mating exhaust ports 45 on the fixed valve stem member 43 upon reciprocation of the valve sleeve 41. The passageways 46 and 47 communicate through the respective passageways 48 and 49 formed in the tool slide member 25 with the respective pressure chambers 50 and 51 of the fluid pressure cylinder 31, as best seen in Figures 2 and 4. Exhaust discharge from ports 44 is collected in the chamber 44a in the tool slide 25 and returns to a fluid reservoir (not shown) through line 44b.

In the servo control valve sleeve 41 is fixed a screw 52 having a headed end 52a under which is provided a compression spring 53 engaging against the surface 54 of the outer cover 25a fixed to the tool slide 25 by suitable screws 25b so as to normally move or bias the valve sleeve 41, to the left in Figure 3, so that the tool slide normally is fed in toward the work or to the right as shown in Figures 3 and 4. A lever arm 55 is pivotally mounted on a pin 56 rigidly held in the member 25a of the tool slide 25 and has an upper end portion 56a engaging the head 52a of the screw 52 and has a lower end portion 57 engaged by a tracer finger plunger 58 carried in a bracket 59 rigidly fixed to the tool slide 25 by suitable screws 60. A stop screw 61 mounted in the lever 55 and engaging a stop pin 62 fixed in the plate member 25a of the tool slide 25 serves to limit the counterclockwise rocking motion, Figure 3, of the lever 55 and therefore the biased adjustment of the tracer valve sleeve 41 by the spring 53 so that the proper normally infeed released position of the tracer finger 58 causes the tool slide to move towards the work at the desired rate, and the tracer plunger 58 has a chisel tip or tapered end 63, Figures 1 and 3, preferably corresponding to the shape of the cutting point P of the cutting tool 28 which engages the irregular surface S of a template plate T carried on a template bar 64.

The template bar is slidably mounted on suitable guideways 65 and 66 of the template bar guide member 67. This member 67 is pivotally mounted on a stud 68 to relatively swing about an axis 69. This stud 68 is carried on a projecting plate member 74 fixed to and carried by the swivel slide 21 on the carriage 16. A suitable adjusting nut and washer 70 on the stud 68 holds the guide member 67 in proper adjustable pivotal condition on the stud 68. A clamping bolt 71 rigidly fixed by a suitable threaded connection 72 in the guide plate 67 extends downwardly, as best seen in Figure 3, through an arcuate slot 73 formed in a projecting plate member 74. A clamping nut and washer 75 are provided on the lower end of the clamping bolt 71 which may be tightened when the guide member 67 has been positioned in desired adjusted position.

Referring to Figure 8, the template bar 64 is pivotally connected by a suitable pin 76 to a cross sliding member 77 guided in suitable guideways 78 formed in a bracket 79 suitably clamped to the machine frame or lathe bed 10 so that the template bar 64 is positively held against longitudinal movement parallel to the work spindle axis 18 but may move transversely thereof in response to movements of the cross slide 16 of the lathe. It is to be noted that the direction of reciprocation of the tracer finger plunger 58 as indicated by the line or plane 80 is at all times radially of the axis 69 of pivotal mounting of the template bar guide 67 so that no matter to what position the swivel slide 21 is swung, the line of movement in the plane 80 will intersect the axis 69 of the pivot 68. As can best be seen in Figure 8, this results in a minimum of change of relative position of template and tracer tip especially when the tracer is operating on the innermost portion 81 of the template surface for any angular setting of the swivel slide 21.

Furthermore, should there not be exact parallel alignment of the template bar, such as its surface 66a with the work spindle axis 18 and the longitudinal movement of the carriage 13 along the bedways 11 and 12, no appreciable deleterious effects will result in the exact parallelism of cutting of the work piece surface. For instance, when doing turning operations as shown in Figure 5, the various steps 82, 83, 84, and 85 will all be cut exactly parallel to the axis of rotation 18 of the lathe despite the fact that the template bar and its template T are not set exactly parallel to the lathe bedways, the spindle axis of rotation 18, and the carriage movement. The template bar may be misaligned from true parallelism as indicated by the difference between the line 66a and the line 86, Figure 8, by an amount, say one thirty-second or one-sixteenth of an inch, as indicated at 87. The template controlled mechanism will still turn all the portions 82, 83, 84, and 85 perfectly straight and parallel to the work axis 18. This follows because the point 88, Figure 8, follows the exact parallel feeding movement path indicated by the line 86 even though the guide member 67 does not have its guideways 65 and 66 set exactly parallel to the spindle axis 18. What actually happens is that the point 88 always stays on the line 86 and the end or pivot connection 76 of the template bar 64 with the cross sliding member 77 causes the member to adjust itself automatically in the guideways 78 in in-and-out movement to take care of and allow the movement of the guide member 67 by the lathe carriage to take place with perfect ease and efficiency. At the same time, it will be noted, however, that the point 88 always remains a fixed distance from the point 89 on the work spindle axis 18 of the lathe regardless as to whether or not the template bar 64 is precisely set parallel to the axis 18.

It will be furthermore noted that ordinary slide misalignments such as indicated for the template bar 64 relative to the axis 18, as indicated at 87, have substantially no effect whatever on the relative distance between the tip 63 of the tracer finger and the point 88 of the guideway engagement between the template bar 64 and the guide member 67 as defined by a line 90 passing through the pivot axis 69 perpendicular to the spindle axis 18. Since the relationship between the points 88 and 69 remain substantially constant, well within any practicable limits to which the work is to be finished, and that these points also remain constant with regard to the point 89 on the work spindle axis, it therefore follows in this arrangement that accuracy of setting of the template bar 64 in exact parallelism with the feeding movement and the work spindle axis is not required, therefore facilitating a rapid set-up and a high degree of accuracy and efficiency in turning the work without requiring the very accurate and precise setting of template bars as used in prior apparatus. By arranging the direction of tracer finger reciprocation in a plane of movement 80 at all times intersecting the axis 69 of pivoting of the guide member 67, a maximum degree of accuracy is maintained in reproducing the template T on the work piece for any position of swiveled location of the swivel slide 25 and the duplicator attachment thereon for any normal misalignment which may occur between the template bar 64 and the direction of feeding movement of the carriage along the bedways.

The features discussed in connection with Figures 1, 5, and 8 pertaining to turning operations with the work on centers are equally well adapted to facing operations, as when work W is held in a chuck as drawn in Figure 6. In this instance the template bar 64 is positioned transverse of the lathe and the cross slide used for the feeding movements of the tool, all other relationships remaining the same as described. The bracket 79 (not shown in Fig. 6) is fixed to the machine frame so the sliding member 77 moves at right angles to the cross slide movement. In Figure 7 is shown the same arrangement as in Figure 6, but with the tool slide swivel in the opposite direction to most advantageously machine a work piece W having surfaces lying intermediate those of the work in Figures 1 and 5, and Figure 6.

There has thus been provided, in a duplicating attachment, a template bar arrangement in which the template bar is held against movement in the direction of relative feeding of the attachment along a work piece and in which the template bar is guided by a member mounted on the duplicating attachment pivotal connection having an axis through which passes a plane defining the direction of relative reciprocation of the tracer finger and template for any position of relative angular movement of the tool slide of the duplicating attachment relative to the work piece. There is provided an arrangement, in which the template bar has movement relative to a tracer finger for controlling the relative movement of a cutting tool to a work piece, which is bodily carried by the attachment for movement to and from the work while at the same time it is guided for the relative movement of template and tracer finger in feeding movement in such a way that the direction of movement of the tracer finger intersects a pivotal connection of a guide member for the template bar on the attachment and in which there is provided means to allow the bodily movement of the template bar transverse to the feeding movement while locking the template bar against movement in the feeding direction which last mentioned means is rigidly fixed to the machine frame.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. In a duplicator for a lathe having a bed, a carriage, a cross slide, a swivel slide, a tool slide reciprocably mounted on said swivel slide, and a tool mounted on the tool slide, an actuating member interconnected between said swivel slide and said tool slide, a tracer mounted on said tool slide, a tracer finger on said tracer, a tracer tip on said finger, a template bar guide member means for pivotally mounting said guide member for horizontal swinging movement about a vertical axis on said swivel slide for swinging movement of said guide member about an axis at right angles to the movement of said tool slide into a plurality of adjusted positions, means for locking said guide member in any of its adjusted positions, guide ways for said tool slide so positioned to guide said tracer tip in a plane defined by said tip and the axis of said pivotal mounting of said guide member, a template bar slidably supported on said template bar guide member, a template carried on said bar operatively engaging said tracer tip to actuate said tracer, and means for adjustably connecting said template bar to the bed of said lathe.

2. In a duplicator for a lathe having a bed, a carriage, a cross slide, a swivel slide, a tool slide reciprocably mounted on said swivel slide, and a tool mounted on the tool slide, an actuating member interconnected between said swivel slide and said tool slide, a tracer mounted on said tool slide, a tracer finger on said tracer, a tracer tip on said finger, a template bar guide member means for pivotally mounting said guide member for horizontal swinging movement about a vertical axis on said swivel slide for swinging movement of said guide member about an axis at right angles to the movement of said tool slide into a plurality of adjusted positions, means for locking said guide member in any of its adjusted positions, guide ways for said tool slide so positioned to guide said tracer tip in a plane defined by said tip and the axis of said pivotal mounting of said guide member, a template bar slidably supported on said template bar guide member, a template carried on said bar operatively engaging said tracer tip to actuate said tracer, and means for adjustably connecting said template bar to the bed of said lathe, including a bed bracket, means for clamping said bracket to the bed, a transversely movable slide on said bracket arranged for movement perpendicular to the direction of movement of the carriage along the bed, and a pivotal connection between said transversely movable slide on said bracket and said template bar.

3. In a duplicator for a lathe having a bed, a carriage, a cross slide, a swivel slide, a tool slide horizontally reciprocably mounted on said swivel slide, a tool mounted on said tool slide, a tracer finger on said tool slide, a tracer tip on said finger, a template bar guide member, means for pivotally mounting said guide member for horizontal swinging movement about a vertical axis on the swivel slide to a plurality of adjusted positions, means for locking said guide member in any of its adjusted positions, guide ways for said tool slide so positioned to guide said tracer tip in a plane defined by said tip and the axis of said pivotal mounting for said guide member, a template bar slidably supported on said template bar guide member, a template carried on said template bar operatively engaging said tracer tip to actuate said tracer, and means for adjustably connecting said template bar to the bed of said lathe.

HAROLD J. SIEKMANN.
GEORGE J. KASSELMANN.

REFERENCES CITED

The following references are of record in the file of this patent:

UNITED STATES PATENTS

| Number | Name | Date |
|---|---|---|
| 253,410 | Miles | Feb. 7, 1882 |
| 502,401 | Hodge | Aug. 1, 1893 |
| 593,359 | Lodge | Nov. 9, 1897 |
| 602,449 | Hill | Apr. 19, 1898 |
| 1,195,293 | Townsend | Aug. 22, 1916 |
| 1,314,744 | Groene | Sept. 2, 1919 |
| 1,635,285 | Lovely | July 12, 1927 |
| 2,051,127 | Bickel | Aug. 18, 1936 |
| 2,437,570 | Von Zelewsky | Mar. 9, 1948 |
| 2,553,984 | Siekmann | May 22, 1951 |
| 2,559,138 | Waterson | July 3, 1951 |